(12) United States Patent
Tschudin et al.

(10) Patent No.: US 12,546,640 B2
(45) Date of Patent: Feb. 10, 2026

(54) MAGNETICALLY INDUCTIVE FLOW MEASURING DEVICE AND METHOD FOR DETERMINING A FILL LEVEL

(71) Applicant: Endress+Hauser Flowtec AG, Reinach (CH)

(72) Inventors: Beat Tschudin, Reinach (CH); Thomas Bier, Riehen (CH)

(73) Assignee: Endress+Hauser Flowtec AG, Reinach (CH)

( * ) Notice: Subject to any disclaimer, the term of this patent is extended or adjusted under 35 U.S.C. 154(b) by 623 days.

(21) Appl. No.: 17/997,964

(22) PCT Filed: Apr. 19, 2021

(86) PCT No.: PCT/EP2021/060039
§ 371 (c)(1),
(2) Date: Nov. 7, 2022

(87) PCT Pub. No.: WO2021/223987
PCT Pub. Date: Nov. 11, 2021

(65) Prior Publication Data
US 2023/0204401 A1    Jun. 29, 2023

(30) Foreign Application Priority Data
May 5, 2020  (DE) ...................... 10 2020 112 129.6

(51) Int. Cl.
*G01F 23/26*  (2022.01)
(52) U.S. Cl.
CPC .................................... *G01F 23/26* (2013.01)
(58) Field of Classification Search
CPC ........ G01F 1/588; G01F 23/26; G01F 23/268; G01F 15/14; G01F 1/58; G01F 1/586; G01F 1/584; G01F 1/56

USPC ................ 73/861.11–861.12, 861.08, 861.94
See application file for complete search history.

(56) References Cited

U.S. PATENT DOCUMENTS

| | | | |
|---|---|---|---|
| 12,055,422 B2 * | 8/2024 | Tschudin | G01F 23/268 |
| 2004/0037349 A1 * | 2/2004 | Budmiger | G01F 1/58 |
| | | | 374/141 |
| 2015/0168188 A1 * | 6/2015 | Reichart | G01F 1/584 |
| | | | 73/861.12 |

FOREIGN PATENT DOCUMENTS

| | | |
|---|---|---|
| DE | 19752368 C1 | 1/2000 |
| DE | 102006014677 A1 | 10/2007 |
| DE | 102011079351 A1 | 1/2013 |
| DE | 102015120730 A1 | 6/2017 |

(Continued)

*Primary Examiner* — John E Breene
*Assistant Examiner* — Truong D Phan
(74) *Attorney, Agent, or Firm* — Kelly J. Smith; Endress+Hauser (USA) Holding, Inc.

(57) ABSTRACT

A magnetically inductive flow meter includes a housing; at least two measuring electrodes for forming a galvanic contact with the medium and for tapping an induced voltage in the medium; a device for generating a magnetic field, wherein the device is arranged in the housing, wherein the device comprises a field guiding assembly and a coil arrangement, wherein the field guiding assembly functions as a sensor electrode for capacitively determining and/or monitoring at least one process variable, in particular a fill level of the medium in the tube line or the measuring tube. The present disclosure also relates to a method for determining a fill level of a medium in a measuring tube or in a tube line using the magnetically inductive flow measuring device.

14 Claims, 4 Drawing Sheets

(56) References Cited

FOREIGN PATENT DOCUMENTS

| | | |
|---|---|---|
| DE | 102017131202 A1 | 6/2019 |
| DE | 102018115629 A1 | 1/2020 |
| DE | 102018126679 A1 | 4/2020 |
| EP | 0892251 A1 | 1/1999 |
| EP | 0892251 B1 | 6/2001 |
| WO | WO-9746852 A1 * 12/1997 | ............ G01F 1/584 |
| WO | 2019192799 A1 | 10/2019 |
| WO | 2020083583 A1 | 4/2020 |

* cited by examiner

MAGNETICALLY INDUCTIVE FLOW MEASURING DEVICE AND METHOD FOR DETERMINING A FILL LEVEL

CROSS-REFERENCE TO RELATED APPLICATIONS

The present application is related to and claims the priority benefit of DPMA Patent Application No. 10 2020 112 129.6, filed on May 5, 2020 and International Patent Application No. PCT/EP2021/060039, filed on Apr. 19, 2021, the entire contents of which are incorporated herein by reference.

TECHNICAL FIELD

The invention relates to a magnetically inductive flow measuring device for determining a flow velocity-dependent measured variable of a flowable medium in a measuring tube or in a tube line and to a method for determining a fill level of a medium in a measuring tube or in a tube line.

BACKGROUND

A magnetically inductive flow measuring device comprises meters that detect a flow velocity-dependent measured variable of a flowable medium relative to the meter based on Faraday's law of electromagnetic induction. Examples of magnetically inductive flow measuring devices are magnetically inductive flow meters and magnetically inductive flow measuring probes.

Magnetically inductive flow meters comprise a measuring tube for conducting a flowable medium and are used to determine the flow rate and the volumetric flow of the medium into a process line. A magnetically inductive flow meter has a device for generating a magnetic field, which generates a magnetic field passing through the measuring tube perpendicularly to the flow direction of the flowing medium. For this purpose, individual coils are usually used, which together form a coil arrangement. In order to realize a predominantly homogeneous magnetic field, pole shoes are formed in addition to the coil cores and are attached such that the magnetic field lines run over the entire tube cross-section substantially perpendicularly to the transverse axis or in parallel to the vertical axis of the measuring tube. A measuring electrode pair attached to the lateral surface of the measuring tube taps an electrical measurement voltage or potential difference which is induced perpendicularly to the flow direction and to the magnetic field and arises when a conductive medium flows in the flow direction when the magnetic field is applied. Since, according to Faraday's law of induction, the tapped measurement voltage depends on the velocity of the flowing medium, the flow rate and, with the inclusion of a known tube cross-section, the volumetric flow can be determined from the induced measurement voltage.

WO 2014/053324 A2 teaches a magnetically inductive flow meter with a fill-level monitoring system which, in addition to the distinction between partial and full filling, allows the determination of the medium temperature with a temperature sensor integrated with a fill-level electrode and at the same time is characterized by a compact structure. For monitoring the fill level, a conductivity of the medium between the fill-level monitoring electrode and a reference electrode or a measuring electrode is determined. For this purpose, it is necessary for the fill-level monitoring electrode to form a galvanic contact with the medium to be conducted. This is disadvantageous in that, as a result, an additional opening for the fill-level monitoring electrode must be provided in the measuring tube, and the fill-level monitoring electrode is thus exposed to a possibly abrasive and corrosive medium without protection.

A device for determining a fill level in a measuring tube is known from DE 196 15 140 A1, which device is configured to determine a capacitance dependent on the dielectric constant of the medium and the fill height using two capacitor plates attached to the outer surfaces of the measuring tube and to determine a fill height from the determined capacitance.

DE 10 2012 006 891 A1 teaches a magnetically inductive flow meter which determines a degree of filling in addition to the flow velocity-dependent measured variable. For this purpose, it has an additional magnetic field generating device which generates a magnetic field whose magnetic field lines run in parallel to the longitudinal axis of the measuring tube. The measurement voltage caused by the additional magnetic field at the strip-shaped measuring electrodes is a measure of the fill level of the medium.

SUMMARY

The object of the invention is to provide an alternative magnetically inductive flow measuring device which is suitable for providing information about a fill level of the medium.

In addition, the object of the invention is to provide an alternative method for a magnetically inductive flow measuring device, with which method a fill level of the medium can be determined.

The object is achieved by the magnetically inductive flow measuring device and the method for determining a fill level according to the present disclosure.

The magnetically inductive flow measuring device according to the invention for determining a flow velocity-dependent measured variable of a flowable medium in a measuring tube or in a tube line comprises:
  a housing;
  at least two measuring electrodes for forming a galvanic contact with the medium and for tapping an induced voltage in the medium;
  a device for generating a magnetic field,
    wherein the device is arranged in the housing,
    wherein the device comprises a field guiding assembly and a coil arrangement,
    wherein the field guiding assembly serves as a sensor electrode for capacitively determining and/or monitoring at least one process variable, in particular a fill level of the medium in the tube line or the measuring tube.

The field guiding assembly serves to amplify and guide the magnetic field generated by the coil arrangement. It comprises at least one field guiding body, such as a coil core, which is arranged in a coil of the coil arrangement. In addition, pole shoes are frequently used, which serve to ensure that when the magnetic field lines of the magnetic field exit the coil core, they run in parallel over the largest possible cross-sectional area of the measuring tube or the tube line. In addition, magnetically inductive flow measuring devices are known in which field return bodies are used in order to guide the generated magnetic field back to the coil core in a controlled manner. The field guiding body may be monolithic or partially monolithic. For example, it is known to form the coil core and the pole shoe in one piece, wherein the part extending through an opening of the coil is referred to as a coil core and the part extending between the coil and the housing wall or measuring tube wall in the direction of the medium is referred to as a pole shoe. The individual components of the field guiding body generally comprise soft magnetic materials. According to the invention, an electrically conductive material is to be used for the field guiding body.

Capacitive fill-level meters are known, which determine the fill level of a medium in a container starting from a determined capacitance or capacitance change. For this purpose, a capacitive fill-level meter has a sensor electrode which is arranged in a housing with an electrically insulating wall and, together with a conductive counter electrode, generally the metallic wall of the container, forms an electric capacitor. A distinction is to be made between applications in which an electrically conductive medium is used and applications in which an electrically non-conductive medium is used. Conductive media which are in electrical contact with the counter electrode assume the electrical potential of the counter electrode so that the electrical field forms substantially in the electrically insulating wall of the housing. If a non-conductive medium is located between the sensor electrode and the counter electrode, the electrical field is formed in the medium, as a result of which the dielectric constant of the medium has a significant influence on the determined capacitance.

Meters based on the capacitive measuring principle are known per se from the prior art and are produced by the applicant in many different designs and sold, for example, under the names Liquicap, Solicap, or Liquipoint. Capacitive meters generally have a substantially cylindrical housing with at least one sensor electrode which can be introduced at least partially into a container or a tube line. On the one hand, rod-shaped meters which extend vertically into the container are widely used, in particular for continuous fill-level measurement. However, for detecting a limit level, meters that can be introduced into the side wall of a respective container have also become known.

The present field guiding assembly has a field guiding body which is electrically conductive. This allows the field guiding assembly to be used for a non-intended purpose and to be configured as a sensor electrode which determines a measuring capacitance on the basis of which statements about the fill level of the medium in the tube line or in the measuring tube can be made. In this case, the medium takes on the role of either the counter electrode or the dielectric.

The present invention is suitable for continuously monitoring and/or determining the fill level, which comprises determining the present fill height, or for determining whether a binary state or which binary state, i.e., full or partial filling, is present.

For the determination of a volumetric flow, the determined flow velocity is multiplied by the cross-sectional area of the measuring tube or of the tube line. However, this applies only if the measuring tube is full. It is therefore advantageous if the magnetically inductive flow measuring device is additionally designed to make a statement as to whether or not a partial filling or full filling is present.

Field devices in the form of multi-sensors are already known. Thus, meters exist which can operate in both a capacitive and a conductive operating mode. Examples thereof are disclosed in documents DE 10 2011 004 807 A1, DE 10 2013 102 055 A1, or DE 10 2014 107 927 A1. In addition to the fill level as process variable, various media-specific properties, such as the electrical conductivity of the medium, or also dielectric properties of the medium, such as its dielectric constant, can be determined by means of such a multi-sensor, as described in DE 10 2013 104 781 A1. Such meters differ from the subject matter of the present invention in particular in that the measuring electrodes are used to determine a conductivity of the medium and not, as according to the invention, to determine an induced measurement voltage. In addition, such meters do not have a device for generating a magnetic field, which is indispensable for determining a flow velocity-dependent measured variable based on Faraday's law of electromagnetic induction.

The flow velocity-dependent measured variable comprises a flow rate, a volumetric flow, and/or a mass flow.

Advantageous embodiment of the invention are the subject matter of the dependent claims.

One embodiment provides that an operating circuit arranged in particular in the housing is in particular electrically connected to the field guiding assembly, wherein the operating circuit is configured to supply an in particular temporally alternating excitation signal to the field guiding assembly, to receive a response signal from the field guiding assembly, and to make a statement about the fill level of the medium in the tube line or the measuring tube at least from the response signal.

During the measurement operation, the sensor electrode is supplied with an excitation signal, generally in the form of an alternating current signal or an alternating voltage signal. This is provided by the operating circuit. The respective process variable, i.e., the present fill level or whether full filling is present, can subsequently be determined from the response signal received from the sensor electrode or a further sensor electrode designed and configured for this purpose. According to the capacitive measuring principle, the dependence of the response signal on the capacitance of the capacitor formed by the sensor electrode and the wall of the container, or of the capacitor formed by the sensor electrode and a second electrode, is utilized. Depending on the conductivity of the medium, either the medium itself or an insulation of the sensor electrode forms the dielectric of this capacitor.

In order to evaluate the response signal received from the sensor electrode with respect to the fill level, either an apparent current measurement or an admittance measurement can then be performed, for example. In the case of an apparent current measurement, the magnitude of the apparent current determined at the sensor electrode is measured. However, since the apparent current itself has an active and a reactive component, the phase angle between the apparent current and the voltage applied to the sensor unit is measured in addition to the apparent current in the case of an admittance measurement. A further possibility for determining a fill level is to determine a frequency shift between a reference signal and response signal, wherein the reference signal is, for example, determined in an adjustment method, for example in a factory adjustment method.

Moreover, the additional determination of the phase angle makes it possible to make statements about a possible accretion formation, as has become known, for example, from DE 10 2004 008 125 A1.

The operating circuit is responsible for feeding, acquiring, and evaluating signals and is designed accordingly. It may be configured to carry out particular operations comprising a control structure in order to provide an excitation signal and determine a response signal. In particular embodiments, the operating circuit forms part of a processing subsystem comprising one or more computing devices with memory, processing, and/or communication hardware. The operating circuit can be a single unit or a multi-part unit, which parts communicate with one another. The functions of the operating circuit can be carried out by hardware and/or software. The operating circuit may contain one or more arithmetic logic units (ALUs), central processing units (CPUs), memories, limiters, conditioners, filters, oscillators, format converters, or the like, which are not shown for the sake of clarity. In one form, the operating circuit can be programmed to execute algorithms and process data according to the operating logic defined by programming instructions, such as software or firmware. Alternatively or additionally, the operating logic for the operating circuit may be defined at least partially by hardwired logic or other hardware, for example by an application-specific integrated circuit (ASIC) of any suitable type. It must be taken into account that the operating circuit can be intended exclusively for the generation of the excitation signal and the determination of the response signal or can furthermore be used in the regulation, control, and activation of one or more other subsystems or aspects of the magnetically inductive flow measuring device.

One embodiment provides that the magnetically inductive flow measuring device comprises a magnetically inductive flow meter, wherein the magnetically inductive flow meter comprises a measuring tube, wherein the measuring tube comprises an electrically insulating measuring tube body, wherein the at least two measuring electrodes are arranged in particular diametrically on the measuring tube body, wherein the measuring tube body comprises an outer surface, wherein the field guiding assembly is arranged on the outer surface.

According to the embodiment, a magnetically inductive flow meter is used to determine the flow velocity-dependent measured variable. In use, the magnetically inductive flow meter is integrated into a tube line. Unlike in a magnetically inductive flow measuring probe, the housing of the magnetically inductive flow meter is not configured to be exposed to the medium to be conducted and in addition does not serve as a separation between the medium and the device for generating the magnetic field.

Conventional measuring tubes have measuring tube bodies which are formed from a conductive material and are therefore not suitable for the present invention. It is indispensable that the measuring tube body is made of an electrically insulating material. The electrically insulating material comprises plastic, ceramic, and/or glass.

One embodiment provides that the field guiding assembly comprises one, in particular exactly one, field guiding body, wherein the field guiding body comprises a coil core and/or a pole shoe.

According to the embodiment, the coil core and/or the pole shoe serves as a sensor electrode and corresponds in terms of functional principle to a capacitive proximity switch which responds, without contact, to an approach of a conductive or non-conductive object, but also of liquids, with an electrical switching signal. The switching signal may be associated with full filling or partial filling of the measuring tube or of the tube line.

One embodiment provides that the field guiding assembly comprises two field guiding bodies arranged in particular diametrically on the outer surface, wherein the field guiding bodies respectively comprise a coil core and/or a pole shoe, wherein the coil arrangement comprises two coils, wherein the two field guiding bodies respectively cooperate with one of the two coils.

According to the embodiment, one of the two field guiding bodies serves as a sensor electrode, or both field guiding bodies respectively serve as a sensor electrode.

If only one of the two field guiding bodies serves as a sensor electrode, the operating circuit is also connected exclusively to the one field guiding body and is configured to impress the excitation signal on the same field guiding body and to likewise determine the response signal at the mentioned field guiding body.

If both field guiding bodies respectively serve as a sensor electrode, both are electrically connected to the operating circuit. In this case, two possible scenarios occur. On the one hand, the operating circuit can be configured to feed an excitation signal at one of the two field guiding bodies and to determine the response signal at the other field guiding body and, on the other hand, the operating circuit can be configured to respectively impress an excitation signal at the two field guiding bodies and to respectively determine a response signal at the two field guiding bodies. In the first case, by changing the dielectric properties of the medium, a decrease in the fill level cannot be unambiguously concluded the measuring capacitance. In particular in the case of deposits or sedimentation, a decrease in the determined measuring capacitance can occur. In the second case, a distinction can advantageously be made between a partial filling and a sedimentation or a deposit. This takes place by comparing the two determined measuring capacitances. If a determined measured value of the measuring capacitance is lower than the reference value, either a non-conductive medium or a medium with a lower dielectric constant, e.g., air or sand, than the medium to be conducted is located in the immediate vicinity of the sensor electrode.

The term "cooperate" in the context of the patent application means that the field guiding bodies are arranged in such a way that the magnetic field generated by the coil arrangement is amplified. This can be realized, for example, in that the field guiding body, in particular the coil core of the field guiding body, is arranged in an opening of a coil of the coil arrangement.

Field guiding assemblies are known in which two diametrically arranged coil cores are connected to one another via field return bodies. The field return bodies serve to guide the magnetic field generated on the side of the one coil core facing away from the medium to the respectively other coil core. If one of the two field guiding bodies is or if both field guiding bodies are electrically connected to the operating circuit, it is essential that the two coil cores are not electrically connected to one another via the field return bodies. An electrical decoupling is realized by the arrangement of an electrical insulator between the coil cores and the field return body. This prevents a short circuit between the two coil cores and at the same time maintains the function of the field return body.

One embodiment provides that exactly one of the two field guiding bodies is connected to the operating circuit.

According to the embodiment, the operating circuit is configured to impress the excitation signal exclusively on the one field guiding body and to determine the response signal to the same. Such an embodiment can be easily implemented in conventional magnetically inductive flow meters.

One embodiment provides that the two field guiding bodies are respectively connected to the operating circuit, and wherein the operating circuit is configured to supply an in particular temporally alternating excitation signal to a first field guiding body of the two field guiding bodies, to receive a response signal from a second field guiding body of the two field guiding bodies, and to make a statement about the fill level of the medium in the measuring tube, about a deposit, and/or about a sedimentation in the measuring tube at least from the response signal, or wherein the operating circuit is configured to respectively supply an in particular temporally alternating excitation signal to a first field guiding body of the two field guiding bodies and a second of the two field guiding bodies, to respectively receive a response signal from the first field guiding body and the second field guiding body, and to make a statement about the fill level of the medium in the measuring tube, about a deposit, and/or about a sedimentation in the measuring tube at least from the two response signals.

The advantage of the embodiment is, as explained above, the possibility of distinguishing between partial filling and sedimentation or deposit.

An advantage of the first mentioned embodiment is the use in media with low conductivity.

According to the second form of the embodiment, the two sensor electrodes respectively serve as a capacitive proximity switch. If the determined measuring capacitance changes, a partial filling or a deposit/sedimentation can be deduced by taking into account the positioning of the field guiding bodies.

One embodiment provides that a reference electrode, which is connected to a reference potential, is arranged on the measuring tube body so as to form a galvanic contact with the flowable medium, wherein the operating circuit is configured to impress the excitation signal with respect to the reference electrode on the field guiding body.

The reference electrode may be designed, for example, as a pin electrode, a mushroom electrode, or as a grounding ring which is arranged between the measuring tube and the tube line.

In addition, the operating circuit is advantageously configured to determine the response signal with respect to the reference electrode at the field guiding body.

One embodiment provides that the operating circuit is in particular electrically connected to the coil arrangement and is configured to generate a clocked magnetic field in which there is a rest phase, in which substantially no coil current flows, between two excitation phases, wherein in the rest phase, the excitation signal is generated and the response signal is received.

In order to avoid a shift of the zero point, a clocked magnetic field with alternating magnetic field direction is in most cases generated via the coil arrangement. In the phases of the excitation phase, in which the coil current at the coil arrangement is substantially constant, the induced measurement voltage is determined and used for the determination of the flow velocity-dependent induced measurement voltage. According to the advantageous embodiment, rest phases, in which the coil current and thus also the generated magnetic field are zero, are provided between individual excitation phases. In these rest phases, the excitation signal is impressed on the sensor electrode and a response signal is determined. This ensures that the induced measurement voltage does not have any influence on the response signal, and the generated excitation signal does not have any influence on the measured induced voltage.

One embodiment provides that the operating circuit is configured to determine a measured value of an electrical capacitance of the field guiding assembly to the medium at least on the basis of the response signal and to determine information regarding the fill level on the basis of a deviation of the determined measured values from a reference value, in particular a reference capacitance.

In the simplest case, the determination of the information regarding the fill level comprises the presence of full filling or partial filling.

The method according to the invention for determining a fill level of a medium in a measuring tube or in a tube line using a magnetically inductive flow measuring device, in particular using the magnetically inductive flow measuring device according to one of the preceding claims and preferably using a magnetically inductive flow meter, comprising the method steps of:

supplying an electrical, in particular temporally alternating, excitation signal to a field guiding body, receiving an electrical response signal from the field guiding body, determining a measuring capacitance or a variable dependent on the measuring capacitance, at least on the basis of the response signal, and determining a fill level of the medium in a tube line or in a measuring tube on the basis of the measuring capacitance or on the basis of the variable dependent on the measuring capacitance.

Advantageous embodiment of the invention are the subject matter of the dependent claims.

One embodiment provides that the field guiding assembly comprises in particular exactly one field guiding body, wherein the excitation signal is supplied in particular exclusively to the field guiding body, wherein the response signal is received in particular exclusively at the field guiding body.

One embodiment provides that the field guiding assembly comprises two field guiding bodies arranged in particular diametrically, wherein the excitation signal is supplied in particular exclusively to a first field guiding body of the two field guiding bodies, wherein the response signal is received in particular exclusively at a second field guiding body of the two field guiding bodies.

BRIEF DESCRIPTION OF THE DRAWINGS

The invention is explained in greater detail with reference to the following figures. The following are shown.

DETAILED DESCRIPTION

Figure 1:
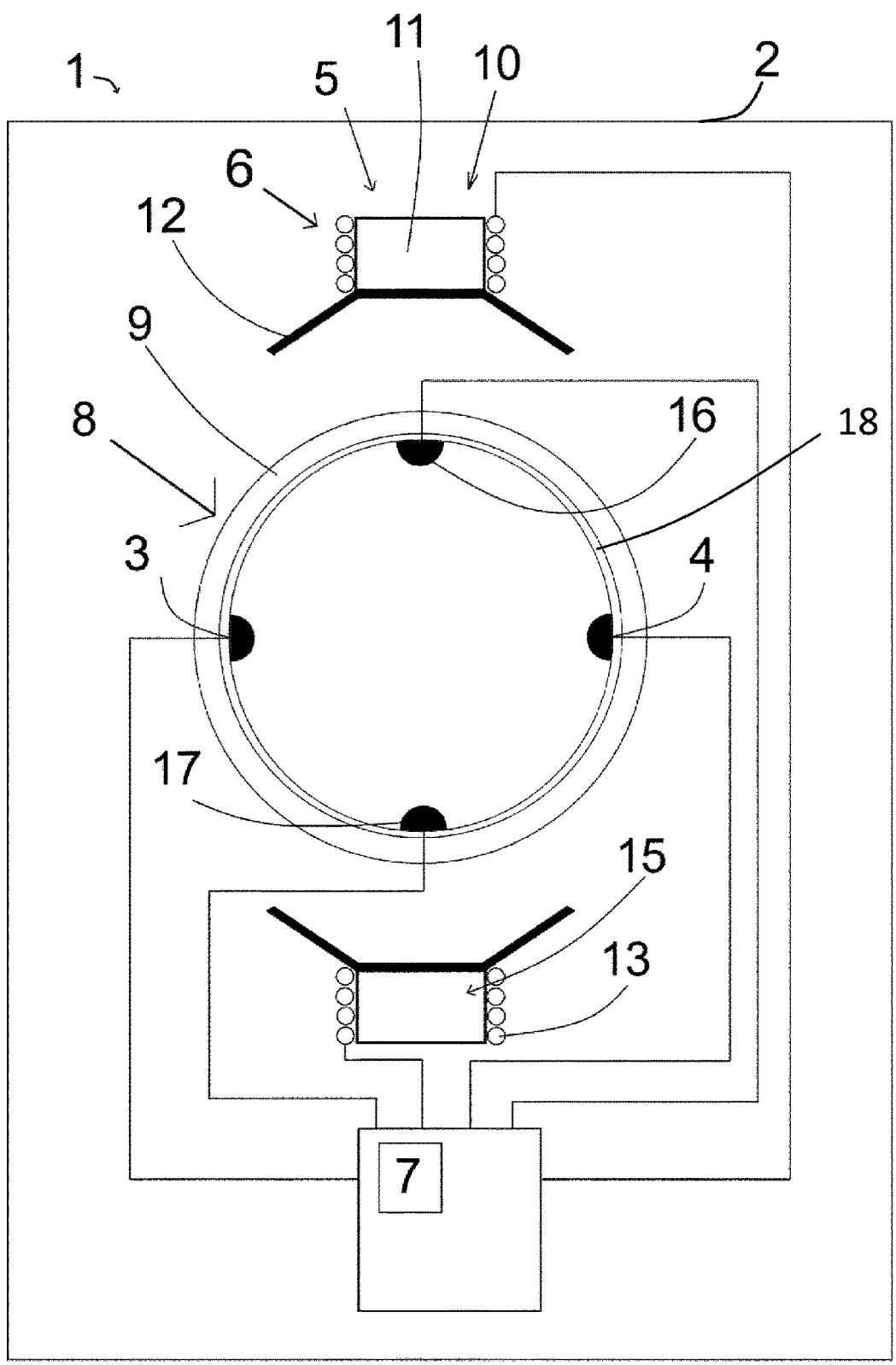
FIG. 1 shows a cross-section through a magnetically inductive flow meter according to the prior art.

FIG. 1 shows a cross-section of a magnetically inductive flow measuring device known from the prior art, namely a magnetically inductive flow meter. The structure and measuring principle of a magnetically inductive flow meter are known in principle. A flowable medium having an electrical conductivity is conducted through a measuring tube 8. A device for generating a magnetic field is arranged on the measuring tube 8 such that the magnetic field lines are oriented substantially perpendicularly to a longitudinal direction defined by the measuring tube axis. The device for generating the magnetic field comprises a field guiding assembly 5 and a coil arrangement 6. The illustrated field guiding assembly 5 comprises two field guiding bodies 10, 15, which respectively comprise a coil core 11, which extends through an opening in a coil, and a pole shoe 12. According to FIG. 1, the device for generating the magnetic field is arranged at a distance from the measuring tube 8. However, the device usually rests on the outer lateral surface of the measuring tube 8. For the sake of clarity, the field return bodies were omitted in the illustration. The field return bodies usually connect the sides of the two coil cores facing away from the medium or the pole shoe. The field guiding bodies 10, 15 have a magnetically and electrically conductive, in particular soft magnetic, material. The coil arrangement 6 comprises two diametrically arranged coils 13 which are respectively formed by a coil holder and a coil wire wound onto the coil holder. A housing 2 protects the device for generating the magnetic field against external influences.

When a magnetic field is applied, a flow-dependent potential distribution forms in the measuring tube 8 and can be tapped using two opposite measuring electrodes 3, 4 attached to the inner wall of the measuring tube body 9. Said measuring electrodes are generally arranged diametrically and form an electrode axis or are intersected by a transverse axis which runs perpendicularly to the magnetic field lines and the longitudinal axis of the measuring tube 8. On the basis of the measured induced measurement voltage, the flow rate and, additionally taking into account the tube cross-sectional area, the volumetric flow of the medium can be determined. In order to prevent the measurement voltage applied to the first and second measuring electrodes 3, 4 from being conducted away via the measuring tube 8, the inner wall is lined with an insulating material, for example a plastic or ceramic liner 18. Alternatively, the measuring tube body is made of an electrically insulating material, such as plastic or ceramic.

The magnetic field built up by the device for generating the magnetic field is, for example, generated by a direct current of alternating polarity clocked by means of an operating circuit 7. This ensures a stable zero point and makes the measurement insensitive to influences due to electrochemical disturbances. A measuring circuit is configured to determine the induced measurement voltage applied to the two measuring electrodes 3, 4, and an evaluation circuit is designed to determine the flow rate and/or the volumetric flow of the medium as a function of the measured measurement voltage. Commercially available magnetically inductive flow meters have two further electrodes 16, 17 in addition to the measuring electrodes 3, 4. On one hand, a fill-level monitoring electrode 16, which is optimally attached at the highest point in the measuring tube 8, serves to detect partial filling of the measuring tube 1 and is configured to forward this information to the user and/or to take into account the fill level in determining the volumetric flow. Furthermore, a reference electrode 17, which is usually attached diametrically to the fill-level monitoring electrode 16 or at the lowest point of the measuring tube cross-section, serves to ensure sufficient grounding of the medium.

Figure 2:
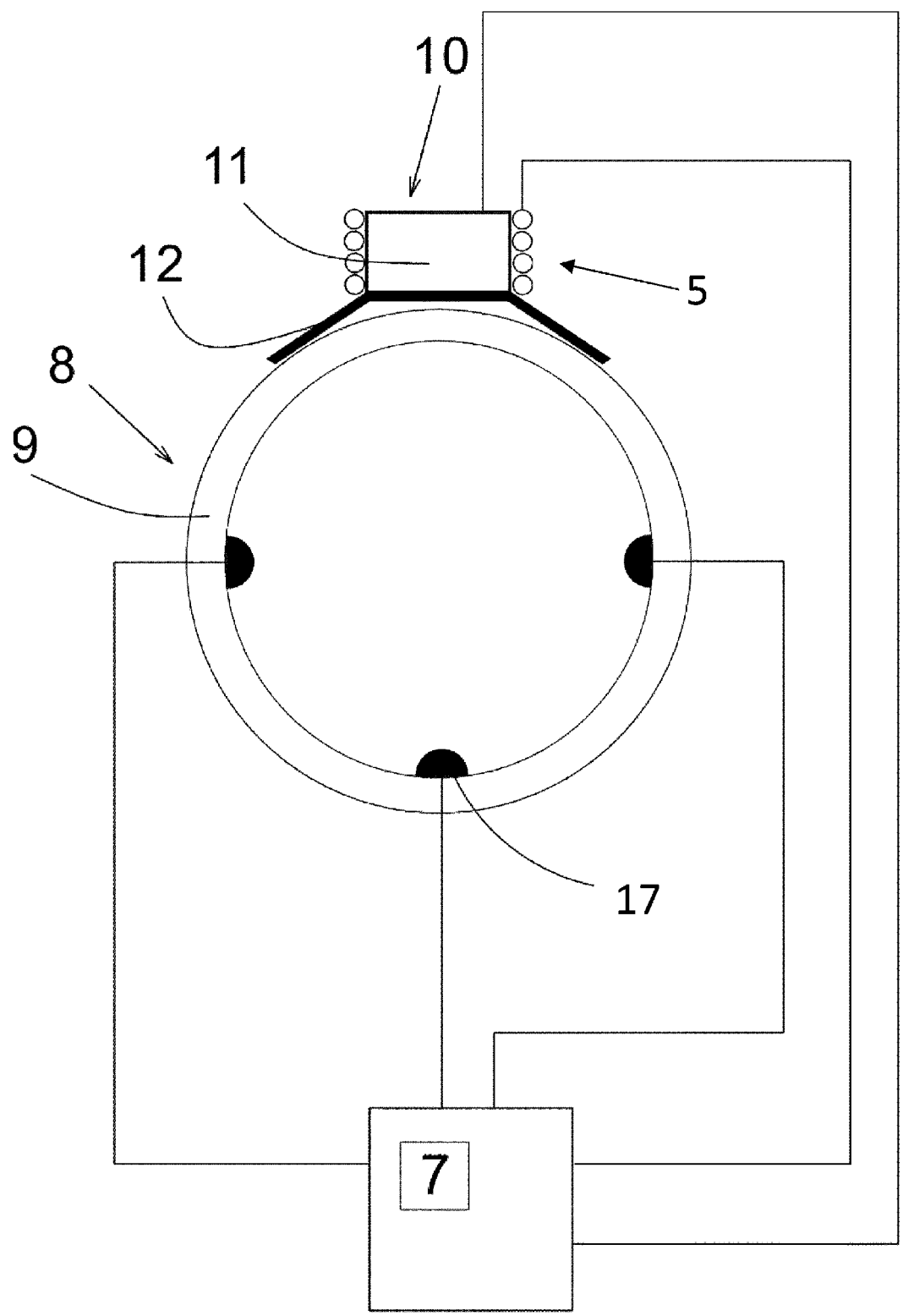
FIG. 2 shows a cross-section through a first embodiment of the magnetically inductive flow meter according to the present disclosure.

FIG. 2 shows a first embodiment of the magnetically inductive flow measuring device according to the invention. The first embodiment differs from the prior art described above essentially in that a fill-level monitoring electrode is dispensed with and a field guiding body 10 is instead used as a sensor electrode for capacitively determining the fill level. The housing was omitted in the illustration for the sake of clarity.

In addition, the field guiding assembly 5 comprises exactly one field guiding body 10 consisting of a coil core 11 and a pole shoe 12. The pole shoe 12 and the coil core 11 are shown in two parts. The field guiding body 10 is connected to the operating circuit 7 via the coil core 11. The operating circuit 7 is configured to impress an excitation signal on the field guiding body 10 and to determine a response signal to the field guiding body 10. Alternatively, the operating circuit 7 can be configured to impress the excitation signal on the pole shoe and to determine the response signal at the same. Both take place with respect to a reference electrode 17 arranged in the measuring tube 8. In the embodiment shown, the reference electrode 17 is a mushroom-shaped electrode which is arranged opposite the field guiding body 10, in the lower region of the measuring tube. However, other forms of reference electrodes are also possible.

The measuring tube 8 comprises a measuring tube body 9, which, unlike in the above prior art, is however formed from an electrically insulating material. Thus, an electrically insulating liner can be dispensed with. If the medium to be conducted has a sufficiently high conductivity, it assumes the function of the counter electrode with regard to the sensor electrode. The dielectric of the capacitor forming as a result of the two electrodes is substantially the electrically insulating wall of the measuring tube body 9.

Alternatively, a further field guiding body may be provided, which, however, is not configured as a sensor electrode and is not electrically connected to the operating circuit.

Figure 3:
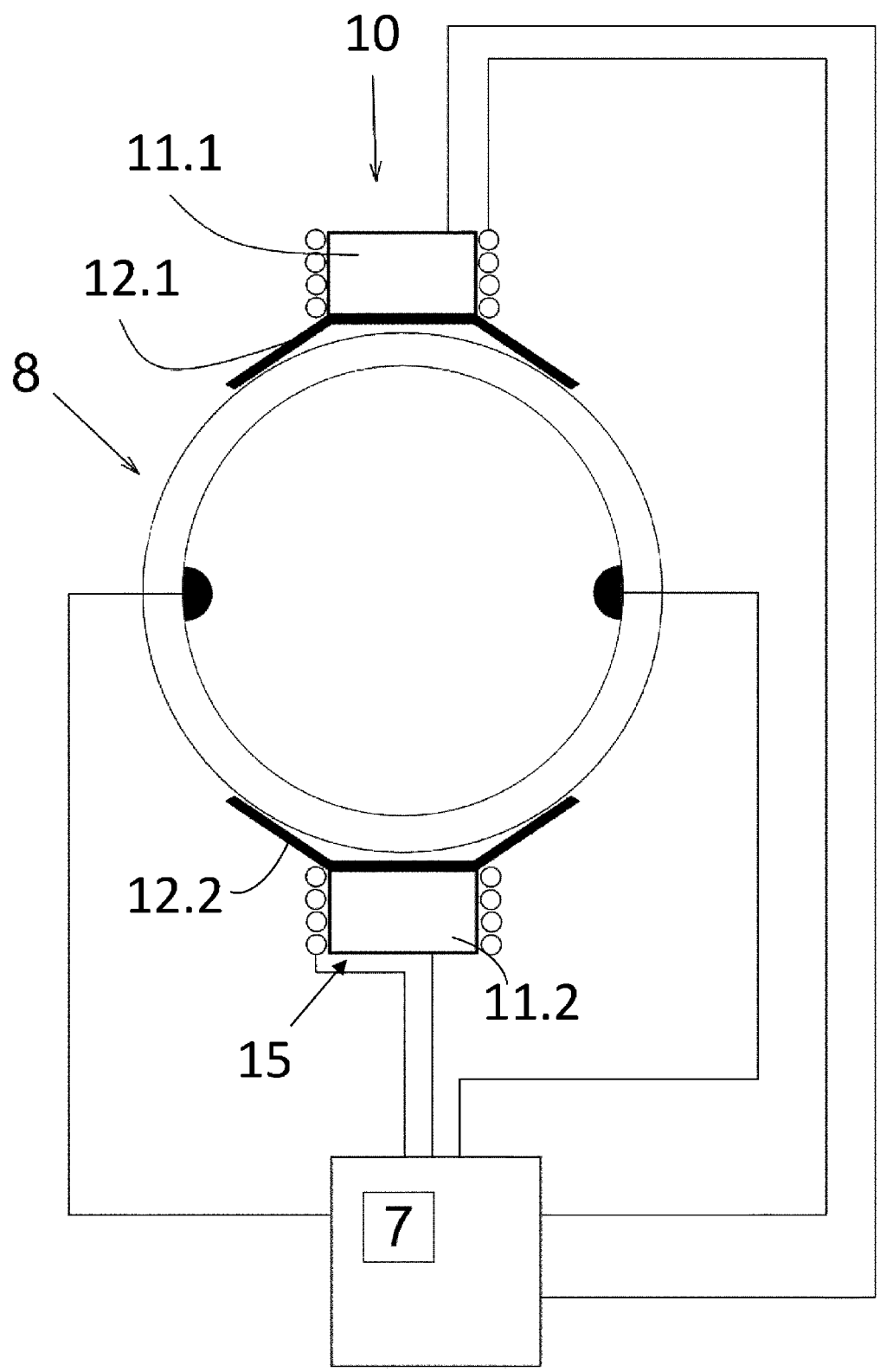
FIG. 3 shows a cross-section through a second embodiment of the magnetically inductive flow meter according to the present disclosure.

FIG. 3 shows a second embodiment of the magnetically inductive flow measuring device according to the invention. The second embodiment differs from the first embodiment essentially in that exactly two field guiding bodies 10, 15 are arranged diametrically on the measuring tube 8 and both are respectively electrically connected to the operating circuit 7. The field guiding bodies 10, 15 respectively comprise a coil core 11.1, 11.2 and a pole shoe 12.1, 12.2. The reference electrode was omitted in the illustration. Said reference electrode can, for example, be designed similarly to the conventional measuring electrodes, for example as a tip electrode, or as a grounding ring.

The operating circuit 7 is electrically connected to the two field guiding bodies 10, 15 and is configured to respectively feed an excitation signal to both field guiding bodies 10, 15 and to respectively determine a response signal which usually has the form of a temporally alternating current. From the two response signals, a measuring capacitance can respectively be determined, on the basis of which statements about any partial filling, deposit, or sedimentation can be made. Alternatively, the operating circuit 7 can be configured to apply an excitation signal to a first field guiding body 10 of the two field guiding bodies 10, 15 and to receive the response signal at a second field guiding body 15 of the two field guiding bodies 10, 15. Taking into account the excitation signal, a measuring capacitance which is dependent on the fill level of the medium in the measuring tube 8 can be determined from the response signal.

Figure 4:
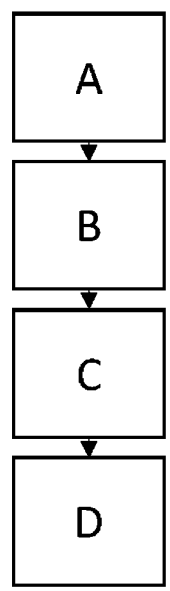
FIG. 4 shows a method sequence according to the present disclosure for determining a fill level of a medium in a measuring tube or in a tube line using a magnetically inductive flow measuring device.

FIG. 4 shows a method sequence according to the invention for determining a fill level of a medium in a measuring tube using a magnetically inductive flow meter. In a first method step A, a temporally alternating excitation signal is applied to a field guiding assembly. The field guiding assembly comprises at least one field guiding body which is formed by at least one coil core and/or at least one pole shoe. The excitation signal is supplied via an operating circuit which is electrically connected to the field guiding assembly or to at least one of the field guiding bodies. In a further method step B, an electrical response signal is received by means of the operating circuit from the field guiding assembly or the field guiding body. In this case, supplying and receiving take place at a single field guiding body. Alternatively, the excitation signal can be applied to a first field guiding body and the response signal can be received at a second field guiding body. On the basis of the response signal, taking into account the excitation signal, in a further method step C, a measuring capacitance is determined, which depends on the fill level of the medium in the measuring tube. In a last method step D, a fill level is then determined as a function of the determined measuring capacitance. Alternatively, a deviation of the determined measuring capacitance from a reference value or a reference range may be determined and a warning message may be output, where applicable.

The invention claimed is:

1. A magnetically inductive flow measuring device for determining a flow velocity-dependent measured variable of a flowable medium in a measuring tube or in a tube line, comprising:
   a housing;
   at least two measuring electrodes for tapping a measurement voltage induced in the flowable medium and for forming a galvanic contact with the medium;
   a device for generating a magnetic field,
      wherein the device is arranged in the housing,
      wherein the device comprises a field guiding assembly and a coil arrangement,
      wherein the field guiding assembly serves as a sensor electrode for capacitively determining a fill level of the medium in the tube line or the measuring tube.

2. The magnetically inductive flow measuring device of claim 1, including:
   an operating circuit arranged in the housing,
   wherein the operating circuit is electrically connected to the field guiding assembly,
   wherein the operating circuit is configured to supply a temporally alternating excitation signal to the field guiding assembly, to receive a response signal from the field guiding assembly, and to make a statement about the fill level of the medium in the tube line or the measuring tube at least from the response signal.

3. The magnetically inductive flow measuring device of claim 1,
   wherein the magnetically inductive flow measuring device comprises a magnetically inductive flow meter,
   wherein the magnetically inductive flow meter comprises a measuring tube,
   wherein the measuring tube comprises an electrically insulating measuring tube body,
   wherein the at least two measuring electrodes are arranged diametrically on the measuring tube body,
   wherein the measuring tube body comprises an outer surface,
   wherein the field guiding assembly is arranged on the outer surface.

4. The magnetically inductive flow measuring device of claim 3,
   wherein the field guiding assembly includes one field guiding body,
   wherein the field guiding body comprises a coil core or pole shoe.

5. The magnetically inductive flow measuring device of claim 3,
   wherein the field guiding assembly comprises two field guiding bodies arranged diametrically on the outer surface,
   wherein the field guiding bodies respectively comprise a coil core or a pole shoe,
   wherein the coil arrangement comprises two coils,
   wherein the two field guiding bodies respectively cooperate with one of the two coils.

6. The magnetically inductive flow measuring device of claim 5,
   wherein exactly one of the two field guiding bodies is connected to the operating circuit.

7. The magnetically inductive flow measuring device of claim 5,
   wherein the two field guiding bodies are respectively connected to the operating circuit,
   wherein the operating circuit is configured to supply a temporally alternating excitation signal to a first field guiding body of the two field guiding bodies, to receive a response signal from a second field guiding body of the two field guiding bodies, and to make a statement about the fill level of the medium in the measuring tube, about a deposit, or about a sedimentation in the measuring tube from the response signal.

8. The magnetically inductive flow measuring device of claim 3, including:
   a reference electrode which is connected to a reference potential,
   wherein the reference electrode is arranged on the measuring tube body so as to form a galvanic contact with the flowable medium,
   wherein the operating circuit is configured to impress the excitation signal with respect to the reference electrode on the field guiding body.

9. The magnetically inductive flow measuring device of claim 3,
   wherein the operating circuit is in particular electrically connected to the coil arrangement and is configured to generate a clocked magnetic field in which there is a rest phase, in which substantially no coil current flows, between two excitation phases,
   wherein in the rest phase, the excitation signal is generated and the response signal is received.

10. The magnetically inductive flow measuring device of claim 3,
    wherein the operating circuit is configured to determine a measured value of an electrical capacitance of the field guiding assembly to the medium at least on the basis of the response signal and to determine information regarding the fill level on the basis of a deviation of the determined measured values from a reference capacitance.

11. A method for determining a fill level of a medium in a measuring tube or in a tube line using a magnetically inductive flow measuring device, comprising the method steps of:
    supplying an electrical temporally alternating, excitation signal to a field guiding assembly;

receiving an electrical response signal from the field guiding assembly;

determining a measuring capacitance, at least on the basis of the response signal; and determining a fill level of the medium in a tube line or in a measuring tube on the basis of the measuring.

12. The method of claim 11, wherein the field guiding assembly comprises exactly one field guiding body, wherein the excitation signal is supplied exclusively to the field guiding body, wherein the response signal is received exclusively at the field guiding body.

13. The method of claim 11, wherein the field guiding assembly comprises two diametrically arranged field guiding bodies, wherein the excitation signal is supplied exclusively to a first field guiding body of the two field guiding bodies, wherein the response signal is received exclusively at a second field guiding body of the two field guiding bodies.

14. The method of claim 11, including the method steps of:

determining a first measuring capacitance, at least on the basis of a first response signal;

determining a second measuring capacitance, at least on the basis of a second response signal; and determining a fill level of the medium in a tube line or in a measuring tube on the basis of the first measuring capacitance and the second measuring capacitance or on the basis of the variable dependent on the first measuring capacitance and the variable dependent on the second measuring capacitance, wherein the field guiding assembly comprises two diametrically arranged field guiding bodies, wherein a first excitation signal is supplied to and the first response signal is received at a first field guiding body of the two field guiding bodies, wherein a second excitation signal is supplied to and the second response signal is received at a second field guiding body of the two field guiding bodies.

* * * * *